United States Patent [19]
Weisbrich

[11] Patent Number: 5,520,505
[45] Date of Patent: May 28, 1996

[54] WIND AMPLIFIED ROTOR PLATFORM (WARP)

[76] Inventor: Alfred L. Weisbrich, 3 Lenora Dr., West Simsbury, Conn. 06092

[21] Appl. No.: 316,781

[22] Filed: Oct. 3, 1994

[51] Int. Cl.⁶ .................... F03D 7/02; F03D 7/04
[52] U.S. Cl. .............. 415/4.1; 415/4.3; 415/60; 415/121.3; 416/9; 416/117; 416/119; 416/122; 416/146 R; 416/DIG. 4
[58] Field of Search ............... 415/4.1–4.5, 60, 415/121.3, 907, 908; 416/9, 117, 119, 120, 122, 130, 146 R, DIG. 4

[56] References Cited

U.S. PATENT DOCUMENTS

| | | | |
|---|---|---|---|
| 1,876,595 | 9/1932 | Beldimano | 415/4.5 |
| 2,418,439 | 4/1947 | Wetherill | 415/60 |
| 4,088,419 | 5/1978 | Hope et al. | 415/60 |
| 4,140,433 | 2/1979 | Eckel | 415/60 |
| 4,156,579 | 5/1979 | Weisbrich | 415/2.1 |
| 4,288,199 | 9/1981 | Weisbrich | 415/4.1 |
| 4,540,333 | 9/1985 | Weisbrich | 415/4.3 |
| 5,062,765 | 11/1991 | McConachy | 415/908 |

Primary Examiner—Edward K. Look
Assistant Examiner—Christopher Verdier

[57] ABSTRACT

An energy conversion device which comprises a stacked array of alternating yawable and fixed toroidal modules about a central core structure. The yawable toroids have typically four impact impellers mounted in their peripheral flow regions for the purpose of capturing flow energy. The fixed toroids are mounted to complement and further enhance fluid flow impact impeller energy capture and to provide housing means for a variety of matter both associated and unassociated with the energy system. The stacked array of a toroid with impellers, designated a Toroidal Rotor Amplifier Platform (TRAP™), and a toroid without impellers, designated a Toroidal Wind Frame (TWF™), is referred to in aggregate, when used for wind energy conversion, as a Wind Amplified Rotor Platforms (WARP™) system. Under wind energy conversion use, a WARP™ system may be used also to both generate electric power and serve as a power line transmission support tower, and/or as a telecommunications or surveillance tower, housing within toroids related structural, transmitting and receiving equipment.

19 Claims, 2 Drawing Sheets

WIND AMPLIFIED ROTOR PLATFORM (WARP)

BACKGROUND OF THE INVENTION

This application is based on patent disclosures No. 319970, filed Oct. 30, 1992 and dated by the PTO Nov. 21, 1992 (with updated disclosure No. 351013, filed Mar. 24, 1994 and PTO dated Mar. 29, 1994), and No. 309262 filed May 1, 1992 and PTO dated May 4, 1992.

1. Field of the Invention

The present invention is concerned with power and energy generation and, more particularly, to fluid flow stream tube capture and flow acceleration means for fluid impact impellers providing a substantially rotational output in response to fluid flow. The invention is contemplated for use in connection with electric power and energy generators and power generating systems in general capable of utilizing said rotational power output from the impact impellers.

2. Description of the Prior Art

Turbine impact impellers of various designs and configurations for providing a rotational output in response to fluid flow are well known in the art. However, prior art impact impeller turbines, particularly for wind energy conversion, are limited in their effectiveness by typical access to low energy density ambient fluid velocity. Since power output is proportional to flow velocity cubed it stands to reason flow velocity amplification can provide substantial power and energy increase given identical size actuator discs of said impact impellers. The prior art relied primarily on increasing diameter of impact impellers to enhance power and energy. This requires more costly and structurally problematic rotating equipment and less user and maintenance friendly assemblies.

A noted improvement over the prior art impact impeller turbine is the Toroidal Accelerator Rotor Platform (TARP), described in U.S. Pat. No. 4,021,140, which is configured to employ only two impact impellers on each unit.

It is thus an object of the present invention to provide means to amplify and accelerate fluid flow in velocity and energy density from ambient free stream levels to higher levels to impact impellers.

It is a further object of the present invention to structurally stack said flow amplifiers about a core structure whereby attendant impact impellers may yaw about said core structure.

It is yet another object of the present invention to provide complementary multi-duty service as an energy converter and a housing and a support structure for other than energy conversion equipment.

3. The Present Invention

The present invention is a power and energy generating device comprising a central core support having peripherally mounted thereto parallel to the core a plurality of alternating first and second fluid flow amplifiers, said first amplifier being yaw rotatable and having substantially the shape of toroids of generally arbitrary cross-sections with respect to planes perpendicular and parallel to its central axis and circumventing said core to provide about the exterior periphery of said core open fluid flow regions in which are located an even number of fluid impact impellers, which may be either horizontal axis or vertical axis rotors, for converting fluid flow energy into mechanical energy and said second amplifiers being static and having substantially the same characteristic shape as said first amplifier but being free of impact impellers and complementary to the tip path of adjacent impact impellers. Such an alternately stacked array of: a toroid with impellers, designated a Toroidal Rotor Amplifier Platform (TRAP™), and a toroid without impellers, designated a Toroidal Wind Frame (TWF™), is referred to in aggregate, when used for wind energy conversion, as a Wind Amplified Rotor Platforms (WARPυ) system. Under wind energy conversion use, it may be used also to both generate electric power and serve as a power line transmission support tower, and/or as a telecommunications or surveillance tower, housing within its toroids related structural, transmitting and receiving equipment.

In tall assemblies, the present invention has the further advantage of a simpler and more economic structure because it eliminates half or more of the yaw assemblies and affiliated electrical transfer mechanisms relative to that of a stacked array of TARPs. This results also from its ability to employ substantially more static versus costlier dynamic yaw structures because at least twice as many impact impellers are accommodated on a single yawing TRAP structure.

Another improvement of the present invention, when configured in WARP™ stacked arrays, is virtual elimination of flow interaction between amplifiers with impellers, particularly under varying yaw orientation, because of separating TWF module presence.

Another improvement of the present invention is better protection from precipitation infiltration potential between amplifier modules due to the more nested and shielded location of adjoining module interfaces.

Another improvement of the present invention is more convenient guy wire attachment means due to presence of stationary TWF modules.

Yet another improvement of the present invention is ability to support and enclose equipment such as wireless communications equipment, including microwave antennas and radar dishes, within stationary TWF modules as well as form a housing for other purposes within TWF modules and TRAP modules for protection from the elements.

SUMMARY OF THE INVENTION

A plurality of omnidirectional modular fluid flow amplifiers which are substantially the shape of toroids of general arbitrary cross-section in planes both perpendicular and parallel to their central axes are mounted about a core structure, thereby providing fluid flow acceleration means about the exterior periphery of said toroids. An even number of fluid impact impellets are mounted on said fluid flow amplifier each in its regions of flow and said fluid flow amplifier is mounted on a yaw assembly fastened to an the interior core support structure about which it may yaw. The toroid fluid flow amplifier may be non-circular in cross-section both perpendicular and parallel to its central axis via eccentrically circumventing its central axis and minor-axis. Each first fluid flow amplifier is furthermore provided with substantially similar complementary static toroid structure, without fluid impact impellers, mounted rigidly adjacent on said core support structure to the first fluid flow amplifier providing thereby further fluid flow and energy density amplification and mass flow entrainment to impellers. The foregoing described arrangement may be replicated into large vertical module arrays providing thereby a multi-modular system with power capacity and energy recovery greater than equivalent multiples of a single unit fluid flow amplifier structure. The invention is contemplated for use in conjunction with electric generators and power and energy generating systems in general capable of utilizing power output from said impact impellers operating within the flow field of said fluid flow amplifiers. Power and signal transfer means from the impact impeller generators may be via slipping, umbilical and soft compliant umbilical cable trays or inductive coupling. When used in a wind environment, a tall vertical WARP™ may be relatively easily, economically and safely erected by building up each amplifier assembly at ground level about and around the core support structure and subsequently winching it up and securing it into place. Also, each toroid amplifier shape may be economically produced and assembled from pieces fabricated and cut from a continuous roll forming process using sheet material. Finally, the energy density to the associated impact impellers and their resulting energy conversion may be further enhanced by fluid flow induced or injected into the core of a WARP™ assembly and ported out through appropriately located apertures in the toroid wall to the exterior peripheral flow regions wherein the impact impellers operate.

DESCRIPTION OF THE PREFERRED EMBODIMENTS

Figure 1:
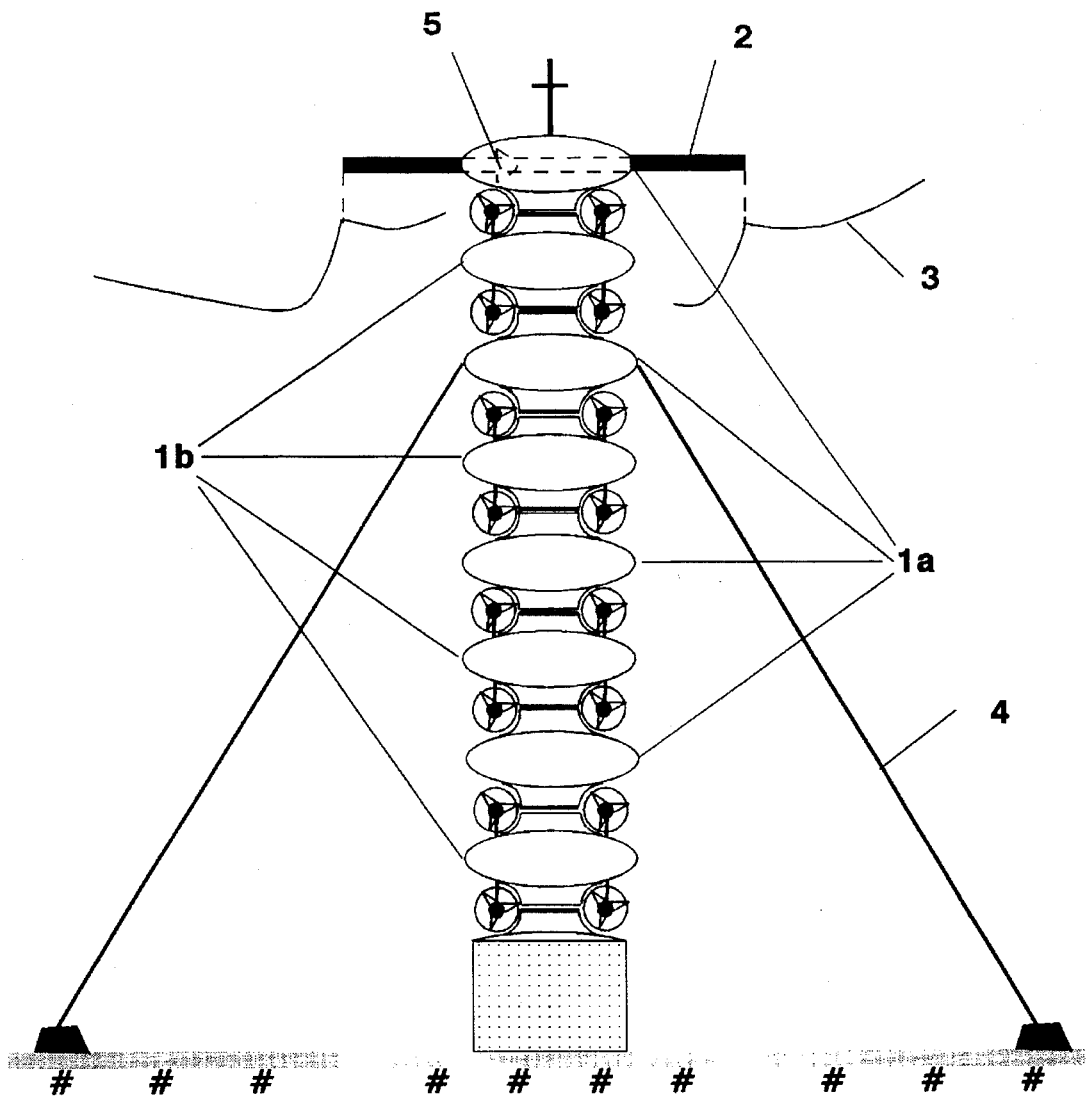
FIG. 1 shows an elevation view of one preferred embodiment of the invention being a stacked array of TRAPs and TWFs, and designated a Wind Amplified Rotor Platforms (WARP™) system.

Referring to FIG. 1, TWFs 1a and TRAPs 1b are alternately stacked vertically over a central core structure, about which TRAP modules 1b may yaw, to configure a WARP™ system. When serving as both a wind energy converter and an electric line transmission tower, the WARP™ structure incorporates a plurality of electric transmission line supports 2 for electric lines 3. Also, an optional plurality of support guy wires 4 are attachable to stationary structural support points thereon for cost effective load reaction. When serving also for communications, wireless communications equipment such as antennas and microwave dishes 5 may be housed internal to TWFs.

Figure 2:
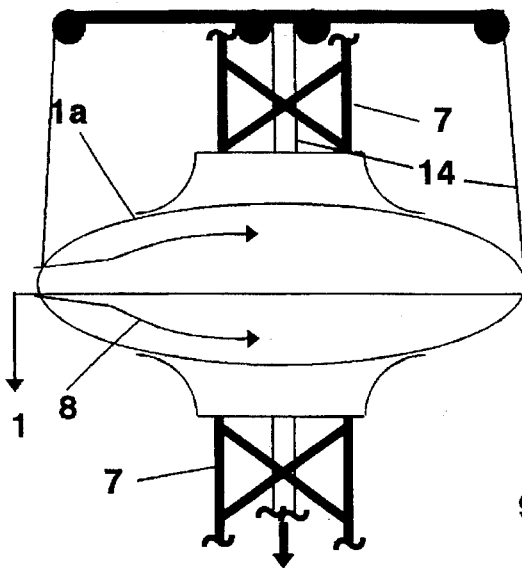
FIG. 2 shows an elevation view of one preferred embodiment of the present Toroid Windframe (TWF) part of the invention.
Figure 4:
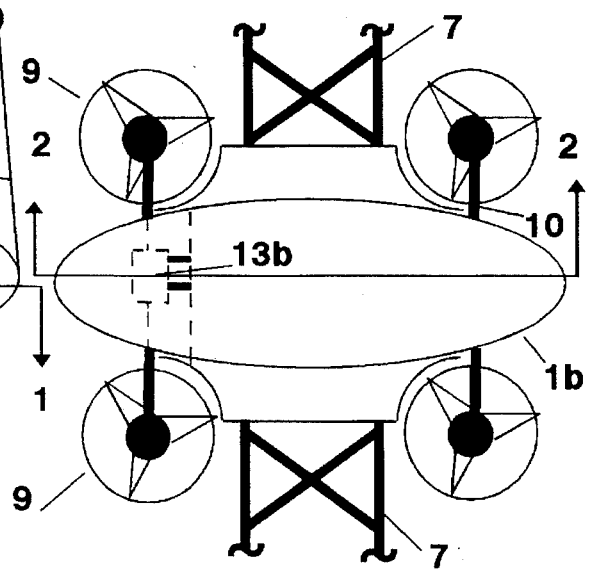
FIG. 4 shows an elevation view of one preferred embodiment of the present Toroidal Rotor Augmenter Platform (TRAP) part of the invention.
Figure 3:
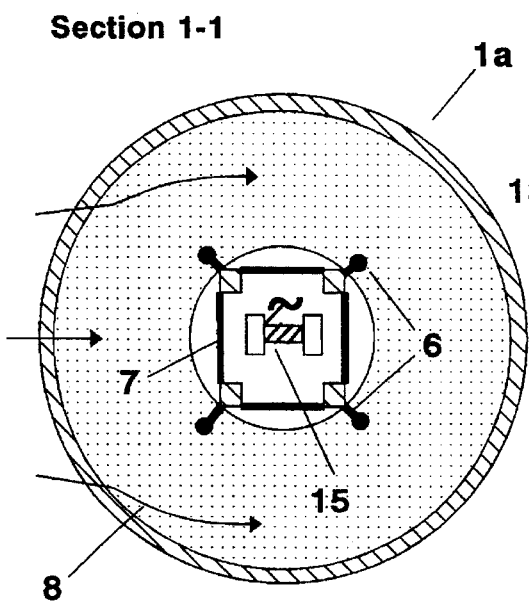
FIG. 3 and FIG. 5 show sectional planform views of preferred embodiments in FIG. 2 and FIG. 4 respectively.
Figure 5:
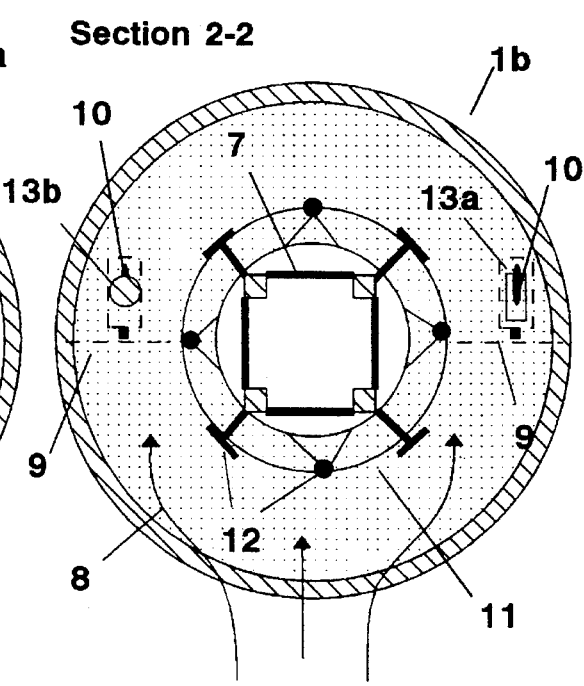

Referring to FIG. 2 and FIG. 3, a Toroidal Windframe (TWF), 1a is illustrated rigidly attached by mounting means 6 to a central core structural frame 7 with TWF fluid flow channel contoured to conform to an adjacent impact impeller's tip path while said impeller operates in response to fluid flow streamlines 8 about the periphery of a similar configuration shown in FIG. 4 and FIG. 5, designated a Toroidal Rotor Augmenter Platform (TRAP) 1b with impact impellers 9 being located substantially at high energy density flow field points about said TRAP 1b peripheral channel means when operational. Referring to FIG. 4 and FIG. 5, TRAP 1b shows four impact impellers 9 mounted by attachment means 10 to the TRAP 1b. TRAP as shown is provided with a yaw assembly with rail 11 and wheels 12 connected to core framework structure 7. The TRAP structure rotates about the core structure 7 in response to directionally shifting fluid flow streamlines 8 and thereby maintains projected actuator discs of impact impellers 9 in augmented fluid flow for energy extraction. Generators 13a and 13b may be located either exterior or interior to TRAP 1b, respectively, as illustrated. Referring to FIG. 2 and FIG. 3, and implicitly also to FIG. 4 and FIG. 5, hoisting cables 14 and winch 15 are illustrated as means of hoisting into place amplifiers substantially parallel to the central core into position on the core support 7.

Various modifications, embodiments and changes will be evident while still remaining within the scope and spirit of the invention.

What I claim is:

1. A power and energy generating device comprising:
a central core support having peripherally mounted thereto parallel to the core a plurality of alternating first and second fluid flow amplifiers, said first amplifier being yaw rotatable and having substantially the shape of toroids of generally arbitrary cross-section and circumventing said core axis to provide about the exterior periphery of said core open fluid flow regions in which are located an even number of fluid impact impellers for converting fluid flow energy into mechanical energy and said second amplifiers being static and having substantially the same characteristic shape as said first amplifiers but being free of impact impellers.

2. A power and energy generating device according to claim 1, wherein each said first amplifier has four impact impellers.

3. A power and energy generating device according to claim 2, wherein said fluid impact impellets comprise horizontal axis rotors.

4. A power and energy generating device according to claim 3, wherein said fluid impact impellers are each coupled to drive generators exterior to said first fluid flow amplifiers.

5. A power and energy generating device according to claim 3, wherein said fluid impact impellers are each coupled to drive generators interior to said first fluid flow amplifiers.

6. A power and energy generating device according to claim 5, wherein each set of two of said fluid impact impellers is coupled to drive one of said generators housed interior to said first fluid flow amplifiers.

7. A power and energy generating device according to claim 2, wherein said fluid impact impellers are coupled to drive generators housed interior to said first fluid flow amplifiers to which the impellers are mounted.

8. A power and energy generating device according to claim 7, wherein each set of two of said fluid impact impellets is coupled to drive one of said generators housed interior to said first fluid flow amplifiers.

9. A power and energy generating device according to claim 6, wherein said second amplifiers are substantially circular in cross-sections.

10. A power and energy generating device according to claim 8, wherein said second amplifiers are substantially circular in cross-sections.

11. A power and energy generating device according to claim 4, wherein said second amplifiers are substantially circular in cross-sections.

12. A power and energy generating device according to claim 2, wherein said first and second amplifiers are substantially circular in cross-sections.

13. A power and energy generating device according to claim 12, wherein said fluid impact impellets comprise horizontal axis rotors.

14. A power and energy generating device comprising:

a central core support having peripherally mounted thereto parallel to the core a plurality of alternating first and second fluid flow amplifiers, said first amplifiers being yaw rotatable and having substantially the shape of toroids of generally arbitrary cross-section and circumventing said core to provide about the exterior periphery of said core open fluid flow regions in which are located an even number of fluid impact impellers for converting fluid flow energy into mechanical energy, and said second amplifiers being static and having substantially the same characteristic shape as said first amplifiers but being free of impact impellers; and housing means interior to said toroids for either non-fluid flow energy conversion equipment or structures or fluids.

15. A power and energy generating device according to claim 14, wherein said second toroid interior housing accommodates support structure for supporting electric transmission cables.

16. A power and energy generating device according to claim 14, wherein said second toroid interior housing accommodates equipment for telecommunications equipment.

17. A power and energy generating device according to claim 14, wherein said second toroid interior housing accommodates support structure for attaching guy cables.

18. A power and energy generating device according to claim 14, wherein said toroids are substantially circular in cross-sections; said first amplifiers have four impellers; said impellers are horizontal axis rotors; and wherein said second toroid interior housings accommodate said equipment and structures comprising electric transmission line support structure or guy cable attachments communications equipment.

19. A power and energy generating device comprising:

a central core support having peripherally mounted thereto parallel to the core a plurality of alternating first and second fluid flow amplifiers, said first amplifiers being yaw rotatable and having substantially the shape of toroids of generally arbitrary cross-sections and circumventing said core to provide about the exterior periphery of said core open fluid flow regions in which are located an even number of fluid impact said second amplifiers being static and having substantially the same characteristic shape as said first amplifiers but being free of impact impellers; housing means interior to said toroids for non-fluid flow energy conversion equipment or structures or fluids; and hoisting means for moving said first and second amplifiers about said central core support and substantially parallel to said central core into position on said core support.

* * * * *